United States Patent [19]
Crumrine

[11] Patent Number: 5,832,655
[45] Date of Patent: Nov. 10, 1998

[54] FISHING SINKER WORM LOCKING APPARATUS

[76] Inventor: Douglas L. Crumrine, 5333 Lynden Ave., Grand Island, Nebr. 68601

[21] Appl. No.: 390,050

[22] Filed: Feb. 2, 1995

[51] Int. Cl.[6] .................................................. A01K 85/00
[52] U.S. Cl. .......................................... 43/42.39; 43/42.36
[58] Field of Search ................. 43/42.36, 42.24, 43/42.39, 44.83, 44.81

[56] References Cited

U.S. PATENT DOCUMENTS

| | | | |
|---|---|---|---|
| Re. 24,247 | 12/1956 | Gehrig | 43/43.1 |
| 675,321 | 5/1901 | Brownfield | 43/42.24 |
| 2,261,068 | 10/1941 | MacKovidy | 43/42.39 |
| 2,435,730 | 2/1948 | Worden | 43/42.36 |
| 2,470,861 | 5/1949 | Prentice | 43/42.36 |
| 2,512,914 | 6/1950 | Boice | 43/42.36 |
| 2,557,030 | 6/1951 | Inglis | 43/15 |
| 2,605,578 | 8/1952 | Waterton | 43/44.2 |
| 2,710,479 | 6/1955 | Gehrig | 43/43.1 |
| 2,792,663 | 5/1957 | Sinclair | 43/43.15 |
| 2,808,678 | 10/1957 | Leonardi | 43/44.8 |
| 3,100,359 | 8/1963 | Laba | 43/35 |
| 3,399,483 | 9/1968 | Naffziger | 43/44.4 |
| 3,518,784 | 7/1970 | Kling | 43/44.83 |
| 4,030,225 | 6/1977 | Earley | 43/44.83 |
| 4,094,087 | 6/1978 | Carpenter | 43/42.39 |
| 4,117,619 | 10/1978 | Stevenson | 43/43.1 |
| 4,942,689 | 7/1990 | Link et al. | 4/42.24 |
| 4,969,287 | 11/1990 | Johnson | 43/42.31 |
| 5,025,586 | 6/1991 | Pixton | 43/42.39 |
| 5,113,616 | 5/1992 | McManus | 43/44.83 |
| 5,152,094 | 10/1992 | Strickland | 43/42.39 |

*Primary Examiner*—Kurt Rowan
*Attorney, Agent, or Firm*—John A. Beehner

[57] ABSTRACT

An improved sinker and hook locking apparatus for locking a sinker and hook together is disclosed. The hook has an eyelet for connecting the hook to a fishing line. The locking apparatus comprises an elongated sinker body with a longitudinal bore for slidably receiving the fishing line therethrough. A spring having a coiled portion adapted to be received in the sinker body, and an opposite J-shaped connector is adapted for engagement with the hook eyelet. The coiled portion being of a size and shape such that when received within the sinker body, a frictional fit is achieved therebetween.

8 Claims, 1 Drawing Sheet

FISHING SINKER WORM LOCKING APPARATUS

BACKGROUND OF THE INVENTION

1. Technical Field

The present invention relates generally to fishing lures. More specifically, it relates to an apparatus providing a locking hook and sinker adapted to avoid underwater entanglements and lessen the fish's ability to free itself from the lure while at the same time providing a realistic presentation to the fish.

2. Description of the Prior Art

Fishermen are on a never ending quest seeking the "killer" fish lure. This quest however is not without trade-offs. For example, the lure which provides the most realistic presentation to the fish may have drawbacks such as susceptibility to snagging or a weight insufficient to permit casting.

Thus, in designing an effective lure, several criteria must be observed and accommodated. The more important of these are weight, presentation, ability to avoid snags, and ease of use (easy installation and removal).

The weight consideration concerns the ability of the fisherman to cast the lure. Enough weight must be provided so that fisherman is able to cast the lure into the desired spot.

Presentation concerns how the lure is presented to the fish. While at one time it was believed that the fish was in some sense able to "see" the lure, this thought has been discarded. Currently, it is believed that the fish has only some vague impression that the object is something edible. The impression results primarily from the lure's movement in the water as opposed to its visual appearance. Thus, what is meant by presentation is not so much the visual appearance of the lure but rather how it behaves or moves in the water.

Snag avoidance and ease of use are practical factors. As is well understood in the art, fish, especially those adapted to be caught with the lure arrangement of the present invention, such as bass, tend to reside in areas comprising underwater structure. Such structure comprises weeds, rocks, branches, and other underwater objects. It goes without saying that in order to catch fish residing in such locations, it is necessary that the lure traverse, or at least be positioned proximate this area. Obviously, something shaped like a fishing hook provides ample opportunity for the lure to become snagged on such underwater objects. As is well known to fishermen, such snags result in high frustration and most likely loss of the lure. Thus, in order to have any type of utility, the lure must be provided with some type of feature reducing its susceptibility to snagging.

Ease of use is another practical consideration which goes not so much to the ability to catch fish but rather the convenience of the fisherman. For example, it is well understood in the art, that in order to be successful on a given fishing outing, one must continuously experiment with the type and size of lure being used in order to find that combination which is most effective for the given environmental factors. Such environmental factors might include light, temperature, water visibility, etc. Thus, in order for the fisherman to be able to experiment with the widest range of lure combinations, he must be able to quickly change lures or artificial baits.

As is well understood by those in the art, there is a virtually limitless variety of lure and bait types ranging from live bait such as nightcrawlers or the like to artificial lures such as plugs, jigs, and plastic worms. It is this latter category of artificial lures, namely plastic worms, grubs, and the like, to which the present invention has particular utility but it is equally well suited to live bait.

Two of the more common ways of rigging plastic worm artificial lures are referred to as the Texas rig and Alabama rig. In both of these configurations, a slip sinker is attached to the line and allowed to slip up and down the fishing line. The Texas rig is thought to be perhaps the most popular worm rig. The configuration was developed in the 1960's and its effectiveness is thought to be at least partially responsible for the explosive popularity in bass fishing beginning about that time.

In its basic configuration, the Texas rig comprises a bullet shaped sinker which is first threaded on the fishing line. A conventional hook is then tied to the end of the fishing line. The point of the hook is then inserted in the top or "head" of the worm and then allow to exit some small distance further down the worm. The head of the worm is then slid up the hook shank until it covers the hook eyelet and knot attaching the hook to the line. Finally, the exposed point of the hook is then reinserted into the worm at a point further down the body without being allowed to protrude therefrom. Thus, the rig provides some degree of resistance to snagging since the barbed point of the hook is not exposed and generally would not become hung up on any underwater objects.

As mentioned above, the sinker is able to slide along the line from the head of the worm backwards. The reason for allowing the sinker to slide along the fishing line was the thought that a fish would be "spooked" and release the lure if it sensed resistance on the line as it began to bite on the lure. However, it has been subsequently determined that such an initial sensation of resistance will not cause the fish to release the lure.

Additionally, allowing the sinker to slide up and down the fishing line presents problems of its own. For example, since the hook and sinker are not fastened together, it is frequently the case that the sinker can be on one side of an underwater obstruction and the hook on the other side. Clearly, this can result in great difficulty in retrieving the lure. Worse yet, if the fish takes the lure at the time that the line is draped across some underwater obstruction, the line can become entangled with the underwater obstruction as the fish begins to run with the lure. Thus, it was previously common for fisherman to "peg" the sinker. This was done by inserting a toothpick or other small object in the axial hole running through the sinker, creating a tight fit with the line and preventing the sinker's sliding. However, there are problems associated with "pegging" which cause serious drawbacks. For example, the action of placing the toothpick or other object adjacent the line in the sinker bore causes trauma on the line resulting in a weak point. Consequently, when the integrity of the line is most critical, for example during retrieval of a fighting fish, the line is more apt to break. Consequently, alternatives have been sought to this "pegging" of the sinker to the line.

One such prior attempt is disclosed in Link, U.S. Pat. No. 4,942,689. Link discloses a fishing weight having a bullet shaped body with an axial hole therethrough. An enlarged recess is formed in one end of the body portion with a flexible rubbery material substantially filling the recess. The rubbery material comprises a cavity which is adapted to releasably receive the eyelet of a conventional fish hook therein. The fishing line is then inserted through the axial bore and tied to the fish hook in the conventional manner. Thereafter, the fish hook eyelet is inserted into the cavity.

The sinker and lure may then be cast and fished in the conventional manner. The hook and sinker would remain releasably secured until a fish bites on the lure. As is well understood in the art, once the fish takes the lure and the fisherman sets the hook, fish will begin to thrash about in an attempt to free itself from the hook. The Link apparatus contemplates that this fighting action by the fish will cause the hook and sinker to separate due to the rubbery material used to secure the hook and sinker. Thus, the Link apparatus suffers from one of the drawbacks of the prior art, namely that the sinker and hook are separated during the retrieval. As mentioned, this increases the likelihood of the line becoming caught on either side of an underwater obstruction, resulting in loss of the fish as well as the lure and sinker.

Another prior art apparatus is the "Florida Weight" manufactured by Gambler Lures. This apparatus utilizes a bullet shaped sinker having a recess in the rear portion thereof which receives a nylon insert therein. An attached screw lock coil is then glued to the nylon insert. The hook is inserted approximately one quarter of an inch through the head of the worm, permitting the screw lock coil to be twisted into the worm. There is no indication that the screw lock coil of the Florida weight is adapted to receive or retain the hook itself. Rather, it is a means for releasably securing the worm itself to the sinker. Clearly, this is not a very secure connection since the artificial worms are made of a soft plastic and since the force exerted by a fighting fish can be quite strong. Therefore, it appears that there is a substantial likelihood that the worm and the sinker could become disconnected during the retrieval of a fish, especially after the lure has been used several times, weakening the plastic.

Therefore, there exists a strong need for a locking sinker apparatus which is capable of locking together the sinker, hook, and artificial bait which is resistive to disengagement by a fighting fish and further resistant to snagging.

Consequently, it is a primary objective of the present invention to provide an improved locking fish weight apparatus for use with conventional hooks and conventional plastic artificial bait.

A further objective is to provide a locking sinker apparatus adapted to retain the hook and bait during the retrieval of a fighting fish.

Another objective is to provide a locking sinker apparatus which may be disengaged from the hook such that the hook may be easily replaced.

Another objective is to provide a locking sinker apparatus wherein the hook may be releasably retained while still providing some degree of movement when it is taken by a fish.

Another objective is to provide a locking sinker apparatus which makes a realistic presentation to a fish.

Another objective is to provide a locking sinker apparatus eliminating the need for "pegging" the sinker to the line.

A further objective is to provide a locking sinker apparatus affording greater resistance to snags in heavy cover.

Another objective is to provide a locking sinker apparatus facilitating a more vertical drop of the lure though weeds.

A final objective is to provide a locking sinker apparatus which is environmentally friendly.

SUMMARY OF THE INVENTION

An improved sinker and hook locking apparatus for locking a sinker and hook together is disclosed. The hook has an eyelet for connecting the hook to a fishing line. The locking apparatus comprises an elongated sinker body with a longitudinal bore for slidably receiving the fishing line therethrough. A spring having a coiled portion adapted to be received in the sinker body, and an opposite J-shaped connector is adapted for engagement with the hook eyelet. The coiled portion being of a size and shape such that when received within the sinker body, a frictional fit is achieved therebetween.

DESCRIPTION OF THE PREFERRED EMBODIMENT

Figure 1:
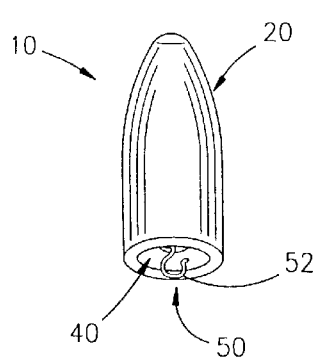
FIG. 1 is a bottom perspective view of the locking sinker apparatus of the present invention.
Figure 2:
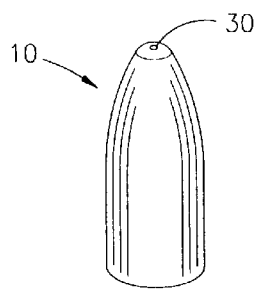
FIG. 2 is a top perspective view thereof.

FIGS. 1 and 2 illustrate the external appearance of the locking sinker apparatus 10 of the present invention. As seen from these figures, the sinker apparatus 10 essentially comprises a body 20 having an axial bore 30 therethrough and an additional recess 40 in the rear portion thereof for receiving spring 50. As explained in more detail below, spring 50 comprises a coiled portion 54 which is received within the body 20 of sinker 10 as well as a J-shaped connector which is used to receive the eyelet 92 of the fish hook.

Figure 3:
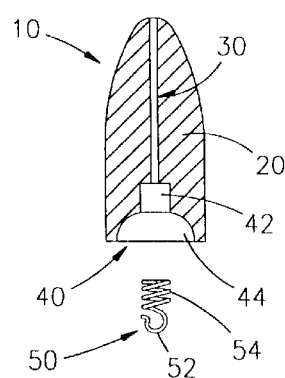
FIG. 3 is cross-sectional exploded view showing the spring which is inserted in the rear portion thereof.
Figure 4:
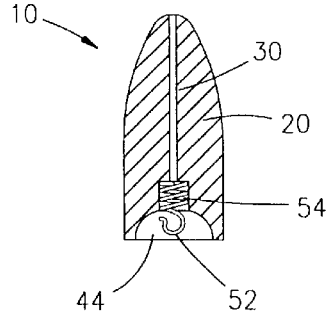
FIG. 4 is a cross-sectional side view showing the spring installed.

FIGS. 3 and 4 are cross-sectional side views more clearly showing the installation of spring 50 in body 20. As seen in these figures, the apparatus 10 comprises a generally bullet shaped body 20 having an axial bore 30 running therethrough. Axial bore 30 is of a size and shape adapted to slidably receive a conventional fishing line therethrough. As is also seen from the figure, the body 20 comprises a countersunk recess 40 in the rear portion thereof. Recess 40 comprises a wider recess 44 having a diameter approaching that of the sinker body 20 and a more narrow recess 42 positioned just forwardly of recess 44. Recesses 44 and 42 are in communication with axial bore 30 and therefore a conventional fishing line may pass entirely through body 20.

The aperture of recess 44 is constructed of a size adapted to receive spring 50 therein as illustrated in FIG. 4. The diameter of recess 42 is just slightly smaller than the diameter of the coiled portion 54 of spring 50 such that a tight frictional fit is achieved when spring 50 is received therein. As mentioned, spring 50 comprises a coiled portion 54 and a J-shaped connector 52. In the preferred embodiment, the spring 50 would be formed from a single piece of wire. The coil 54 of spring 50 allows spring 50 to be threadably received in recess 42. As mentioned, the aperture of recess 42 is of a size to permit a tight frictional engagement with coil 54 when received therein. The length of coil 54 is sufficient so that when the coil is fully received in recess 42, the J-shaped connector 52 will protrude into recess portion 44 as indicated in FIG. 4 such that a hook eyelet 92 may be placed thereon.

Figure 5:
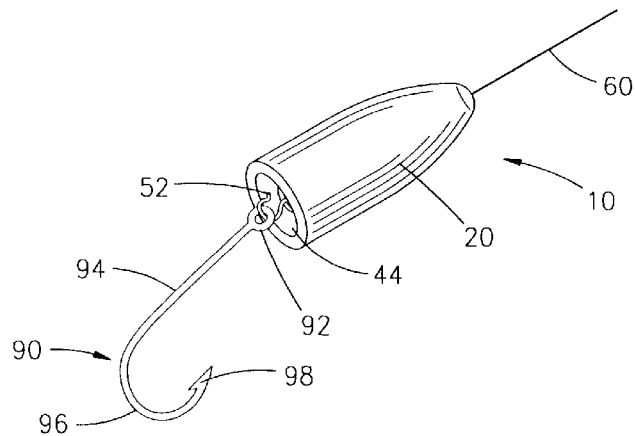
FIG. 5 is a bottom perspective view showing a conventional fish hook secured thereto.

FIG. 5 is a bottom perspective view showing the locking sinker apparatus with the conventional hook secured thereto as would be the case in the preferred working configuration. As seen in this figure, the eyelet 92 of a conventional hook 90 would be engaged with J-connector 52 on spring 50. As seen from the shape of connector 52 and its position within recess 44 (FIG. 4), it is clear that a concerted effort is required to remove hook 90 from sinker 10. Thus, hook 90 is not likely to be inadvertently disengaged from sinker 10, even when a vigorous fight is put up by a fish. Thus a major advantage is provided over the prior art. FIG. 5 also illustrated the connection of the hook with the line 60. As seen in this preferred working embodiment, line 60 would be tied to eyelet 92 of hook 90 in the conventional fashion. Line 60 would not be secure to spring 50 but rather, would pass therethrough.

Figure 6:
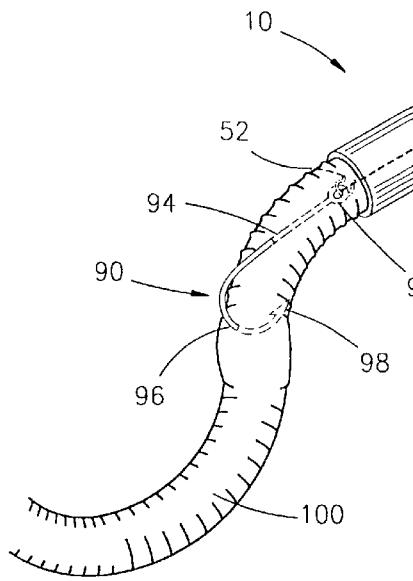
FIG. 6 is a bottom perspective view showing the apparatus in its working configuration with a plastic worm secured to the fish hook.

FIG. 6 is a perspective view similar to that presented in FIG. 5 but with an artificial worm installed thereto. The installation of a worm 100 on hook 90 as indicated in FIG. 6 is commonly referred to by those in the art as a Texas rig. As seen in this embodiment, the majority of the shank 94 of hook 90 is embedded within the plastic body of worm 100. A small portion of the shank 94 and bend 96 are exposed with the remainder of the hook and point being received in the worm 100. As also seen in this figure, the connector portion 52 of spring 50 is adapted to be received in the forward or "head" portion of the worm. Further, it will be observed from the figure that the recess 44 in the rear portion of body 20 is adapted to receive the forwardmost portion of the worm therein. Thus, the working embodiment of FIG. 6 provides a substantially unitary sinker and lure apparatus which has a highly effective presentation yet is not susceptible to many of the prior art drawbacks.

Figure 7:
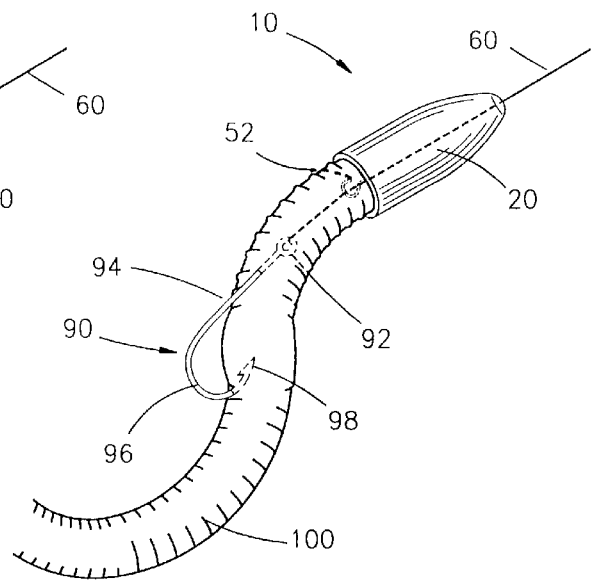
FIG. 7 is a bottom perspective view of an alternative embodiment wherein the hook is more deeply embedded in the plastic worm.

FIG. 7 is an illustration of an alternative embodiment of the present invention wherein the hook eyelet 92 is not engaged by connector 52 of spring 50. The embodiment of FIG. 7 would be used when a longer worm body 100 is desired. As seen in this figure, the J-connector 52 is received in the forward portion of the worm body and the hook 90 is embedded in the worm at a point further back than that illustrated in FIG. 6. Line 60 would still be connected to eyelet 92 of hook 90 which, in addition to the embedding of connector 52 in worm body 100, would serve to establish a semi-unitary fishing lure. As seen in this figure, the most forward portion of worm 100 is still adapted to be received within recess 44 in body 20.

It is obvious that numerous other modifications and variations of the present invention are possible in view of the above teachings. For example, the size, shape and color of the sinker body may be quite varied. Additionally, the means for releasably retaining the hook may be varied such a using a loop and hook arrangement or the like.

Therefore it is to be understood that the above description is in no way intended to limit the scope of protection of the claims and is representative of only one of several possible embodiments of the present invention.

There has thus been shown and described an invention which accomplishes at least all of the stated objectives.

I claim:

1. An improved sinker and hook locking apparatus for locking a sinker and hook together, the hook having an eyelet for connecting the hook to a fishing line, the locking apparatus comprising:

an elongated bullet shaped sinker body with a longitudinal bore for slidably receiving said fishing line therethrough, said bullet shaped sinker body having a tapered forward portion and a wider rear portion; and a spring having a coiled portion and an opposite J-shaped connector portion adapted for engagement with said hook eyelet, said coiled portion being of a size and shape such that it may be received within said bore in said rear portion of said body, said coiled portion having a diameter slightly larger than said sinker bore such that a frictional fit is achieved therebetween when said coiled portion is received therein.

2. The sinker locking apparatus of claim 1 wherein said bore comprises a smaller axial bore extending lengthwise through said sinker and a larger diameter counter sunk bore in said rear portion of said sinker body, said countersunk bore adapted to receive and frictionally engage said spring coil.

3. The sinker locking apparatus of claim 2 wherein said countersunk bore is of a diameter smaller than said spring coil such that upon reception of said coil within said bore, a friction tight fit is achieved therebetween.

4. An improved sinker and hook locking apparatus for locking a sinker and hook together, the hook having an eyelet for connecting the hook to a fishing line, the locking apparatus comprising:

a sinker body with a longitudinal bore for slidably receiving said fishing line therethrough, said sinker body having forward and rear portions; and a coil spring adapted to be received in said sinker body to engage and releasably retain said hook adjacent said rear portion of said sinker body such that said hook may be removed therefrom vet is adapted to remain secured thereto when taken by a fish.

5. In combination:

a fishing line, a fish hook having an eyelet for connection of said fishing line to said fish hook; and a locking sinker apparatus having;

an elongated bullet shaped sinker body with a longitudinal bore for slidably receiving said fishing line therethrough, said bullet shaped sinker body having a tapered forward portion and a wider rear portion;

a spring having a coiled portion and an opposite J-shaped connector portion adapted for engagement with said hook eyelet, said coiled portion being of a size and shape such that it may be received within said bore in said rear portion of said body, said coiled portion having a diameter slightly larger than said sinker bore such that a frictional fit is achieved therebetween when said spring is received therein, said connector portion being adapted to receive said eyelet of said fish hook thereon; and said fishing line adapted to be fastened to said hook eyelet such that upon fastening of said fishing line to said eyelet, and upon engagement of said hook eyelet by said J-shaped connector portion of said spring, a substantially unitary hook sinker apparatus is formed.

6. The combination of claim 5 further comprising an artificial bait having front and tail portions and adapted for receiving said hook substantially at said head of said bait such that upon fastening of said bait to said hook said head of said artificial bait may be received in said rear portion of said sinker.

7. The combination of claim 6 wherein said artificial bait is a worm.

8. In combination:

a fishing line, a fish hook having an eyelet for connection of said fishing line to said fish hook; and a locking sinker apparatus having;

an elongated bullet shaped sinker body with a longitudinal bore for slidably receiving said fishing line therethrough, said bullet shaped sinker body having a tapered forward portion and a wider rear portion;

a spring having a coiled portion and an opposite J-shaped connector portion adapted for engagement with said fish hook eyelet, said coiled portion being received within said bore in said sinker body, said coiled portion having a diameter slightly larger than said sinker bore such that a frictional fit is achieved therebetween, said connector portion being adapted to receive said eyelet of said fish hook thereon; and said fishing line adapted to be fastened to said fish hook eyelet such that upon fastening of said fishing line to said eyelet, and upon engagement of said hook eyelet by said J-shaped connector portion of said spring, a substantially unitary hook sinker apparatus is formed.

* * * * *